US011537543B2

(12) United States Patent
Tummala et al.

(10) Patent No.: US 11,537,543 B2
(45) Date of Patent: Dec. 27, 2022

(54) TECHNIQUE FOR HANDLING PROTOCOL CONVERSION

(71) Applicant: Arm Limited, Cambridge (GB)

(72) Inventors: Ashok Kumar Tummala, Cedar Park, TX (US); Jamshed Jalal, Austin, TX (US); Antony John Harris, Hathersage (GB); Jeffrey Carl Defilippi, Austin, TX (US); Anitha Kona, Austin, TX (US); Bruce James Mathewson, Papworth Everard (GB)

(73) Assignee: Arm Limited, Cambridge (GB)

( * ) Notice: Subject to any disclaimer, the term of this patent is extended or adjusted under 35 U.S.C. 154(b) by 123 days.

(21) Appl. No.: 17/189,781

(22) Filed: Mar. 2, 2021

(65) Prior Publication Data
US 2022/0283972 A1 Sep. 8, 2022

(51) Int. Cl.
*G06F 13/38* (2006.01)
*G06F 13/40* (2006.01)

(52) U.S. Cl.
CPC ........ *G06F 13/387* (2013.01); *G06F 13/4004* (2013.01); *G06F 13/4027* (2013.01); *G06F 13/4068* (2013.01)

(58) Field of Classification Search
CPC .... G06F 13/382; G06F 13/385; G06F 13/387; G06F 13/4004; G06F 13/4027; G06F 13/4063; G06F 13/4068
See application file for complete search history.

(56) References Cited

U.S. PATENT DOCUMENTS 6,263,391 B1 * 7/2001 Pecone ................. G06F 13/409
345/503
7,307,995 B1 * 12/2007 Iyer ........................ H04L 45/00
370/395.32
(Continued)

FOREIGN PATENT DOCUMENTS

CN        111611187 A  *  9/2020  ........... G06F 13/382

OTHER PUBLICATIONS

"Universal protocol conversion bridge and SoC for CHI bus". Google Patents Translation of CN111611187A. Retrieved from Internet Aug. 26, 2022. <https://patents.google.com/patent/CN111611187A/en?oq=CN+111611187+A>. (Year: 2022).*

*Primary Examiner* — Thomas J. Cleary
(74) *Attorney, Agent, or Firm* — Nixon & Vanderhye P.C.

(57) ABSTRACT

An apparatus and method are provided for handling protocol conversion. The apparatus has interconnect circuitry for routing messages between components coupled to the interconnect circuitry in a manner that conforms to a first communication protocol. Protocol conversion circuitry is coupled between the interconnect circuitry and an external communication path, for converting messages between the first communication protocol and a second communication protocol that has a layered architecture comprising multiple layers. The protocol conversion circuitry has a gateway component forming one of the components coupled to the interconnect circuitry, and a controller coupled with the gateway component and used to control connection with the external communication path. For a selected layer of the multiple layers, the protocol conversion circuitry provides, within the gateway component, upper selected layer circuitry to implement a first portion of functionality of the selected layer, where the first portion comprises at least protocol dependent functionality of the selected layer. It also provides, within the controller, lower selected layer circuitry (Continued)

to implement a remaining portion of the functionality of the selected layer, the remaining portion comprising only protocol independent functionality of the selected layer.

20 Claims, 9 Drawing Sheets

(56) References Cited

U.S. PATENT DOCUMENTS

| | | | | |
|---|---|---|---|---|
| 7,406,038 | B1* | 7/2008 | Oelke | H04L 49/40 370/227 |
| RE42,788 | E* | 10/2011 | Bourlas | H04L 9/40 370/347 |
| 11,100,028 | B1* | 8/2021 | Subramaniam | G06F 13/4221 |
| 2003/0202510 | A1* | 10/2003 | Witkowski | H04L 49/3009 370/386 |
| 2013/0083678 | A1* | 4/2013 | Yin | H04W 72/1215 370/252 |
| 2013/0325965 | A1* | 12/2013 | Egan | H04L 12/2838 709/204 |
| 2013/0331094 | A1* | 12/2013 | Egan | H04W 88/06 455/426.1 |
| 2016/0337465 | A1* | 11/2016 | Tarre | G06F 9/00 |
| 2018/0102338 | A1* | 4/2018 | McLellan | H01L 23/5383 |
| 2018/0183899 | A1* | 6/2018 | Ansari | H04N 21/8547 |
| 2021/0157758 | A1* | 5/2021 | Turpin | H04L 67/12 |
| 2022/0114131 | A1* | 4/2022 | Pappu | G06F 13/4221 |
| 2022/0206772 | A1* | 6/2022 | Akiona | G06F 8/60 |
| 2022/0222194 | A1* | 7/2022 | Chandwani | G06F 13/1668 |

* cited by examiner

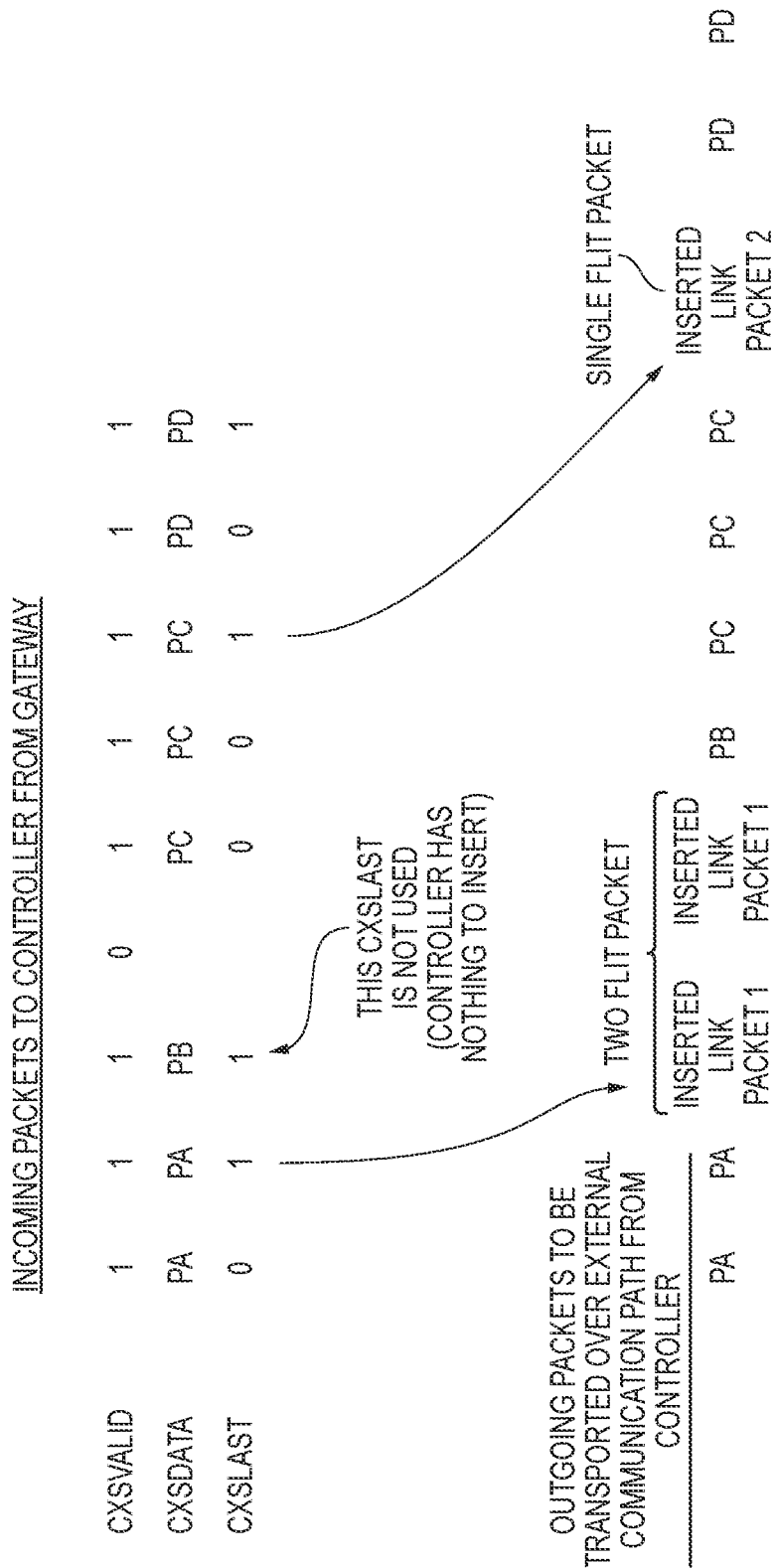

TECHNIQUE FOR HANDLING PROTOCOL CONVERSION

BACKGROUND

A technique for handling protocol conversion is described herein.

Often an integrated circuit, for example a System-on-Chip (SoC), will include interconnect circuitry that is used to route messages between various components that are coupled to that interconnect circuitry. Typically the messages will be routed through the interconnect circuitry in a manner that conforms to a communication protocol defined for the interconnect circuitry.

However, it is also typically necessary to connect such an integrated circuit to one or more external communication paths, and those external communication paths will typically operate in accordance with different communication protocols to the communication protocol used by the interconnect circuitry. Accordingly, for any such external communication path it is typically necessary to provide protocol conversion circuitry that can be coupled between the interconnect circuitry and that external communication path, and used to convert messages between the communication protocol used by the interconnect circuitry and the communication circuitry used by the external communication path. Often such protocol conversion circuitry will be formed by multiple components, for example a component associated with the interconnect circuitry to provide a bridging and interface block to the interconnect circuitry, and another component to control connection with the external communication path, and typically each of these components will need to be designed taking into account the specific communication protocol used by the external communication path. As a result, separate protocol conversion circuits typically need to be designed for each different implementation, with associated cost and complexity implications.

It would be desirable to provide a more efficient and flexible mechanism for implementing such protocol conversion circuitry.

SUMMARY

In one example arrangement, there is provided an apparatus comprising: interconnect circuitry to route messages between components coupled to the interconnect circuitry, the messages routed over the interconnect circuitry conforming to a first communication protocol; and protocol conversion circuitry coupled between the interconnect circuitry and an external communication path, and used to convert messages that are routed though the protocol conversion circuitry between the first communication protocol and a second communication protocol, the second communication protocol having a layered architecture comprising multiple layers; the protocol conversion circuitry comprising a gateway component forming one of the components coupled to the interconnect circuitry, and a controller coupled with the gateway component and used to control connection with the external communication path; the protocol conversion circuitry being arranged, for a selected layer of the multiple layers, to provide within the gateway component upper selected layer circuitry to implement a first portion of functionality of the selected layer, the first portion comprising at least protocol dependent functionality of the selected layer, and to provide within the controller lower selected layer circuitry to implement a remaining portion of the functionality of the selected layer, the remaining portion comprising only protocol independent functionality of the selected layer.

In another example arrangement, there is provided a gateway component for coupling between interconnect circuitry and a controller used to control connection with an external communication path, the gateway component for operating in combination with the controller to form protocol conversion circuitry used to convert messages that are routed though the protocol conversion circuitry between a first communication protocol and a second communication protocol, the second communication protocol having a layered architecture comprising multiple layers, the gateway component comprising: upper selected layer circuitry to implement a first portion of functionality of a selected layer of the multiple layers, the first portion comprising at least protocol dependent functionality of the selected layer; wherein the gateway component is arranged to communicate with the controller in a manner that enables the controller to implement a remaining portion of the functionality of the selected layer, the remaining portion comprising only protocol independent functionality of the selected layer.

In a still further example arrangement, there is provided a controller for coupling between an external communication path and a gateway component provided for interconnect circuitry, wherein the controller is used to control connection with the external communication path and is arranged to operate in combination with the gateway component to form protocol conversion circuitry used to convert messages that are routed though the protocol conversion circuitry between a first communication protocol and a second communication protocol, the second communication protocol having a layered architecture comprising multiple layers, the controller comprising: message processing circuitry to process messages in a manner that takes into account that the gateway component is arranged to implement a first portion of functionality of a selected layer of the multiple layers, the first portion comprising at least protocol dependent functionality of the selected layer; and the message processing circuitry comprises lower selected layer circuitry to implement a remaining portion of the functionality of the selected layer, the remaining portion comprising only protocol independent functionality of the selected layer.

In additional example arrangement, there is provided a method of handling protocol conversion, comprising: employing interconnect circuitry to route messages between components coupled to the interconnect circuitry, the messages routed over the interconnect circuitry conforming to a first communication protocol; employing protocol conversion circuitry, coupled between the interconnect circuitry and an external communication path, to convert messages that are routed though the protocol conversion circuitry between the first communication protocol and a second communication protocol, the second communication protocol having a layered architecture comprising multiple layers; implementing the protocol conversion circuitry using a gateway component forming one of the components coupled to the interconnect circuitry, and a controller coupled with the gateway component and used to control connection with the external communication path; and for a selected layer of the multiple layers: providing within the gateway component upper selected layer circuitry to implement a first portion of functionality of the selected layer, the first portion comprising at least protocol dependent functionality of the selected layer; and providing within the controller lower selected layer circuitry to implement a remaining portion of the functionality of the selected layer, the remaining portion comprising only protocol independent functionality of the selected layer.

BRIEF DESCRIPTION OF THE DRAWINGS

The present technique will be described further, by way of illustration only, with reference to examples thereof as illustrated in the accompanying drawings, in which:

FIG. 5B illustrates how the last message flag may be used by the controller to determine when additional packets can be inserted by the controller, in accordance with one example implementation;

DESCRIPTION OF EXAMPLES

Figure 1:
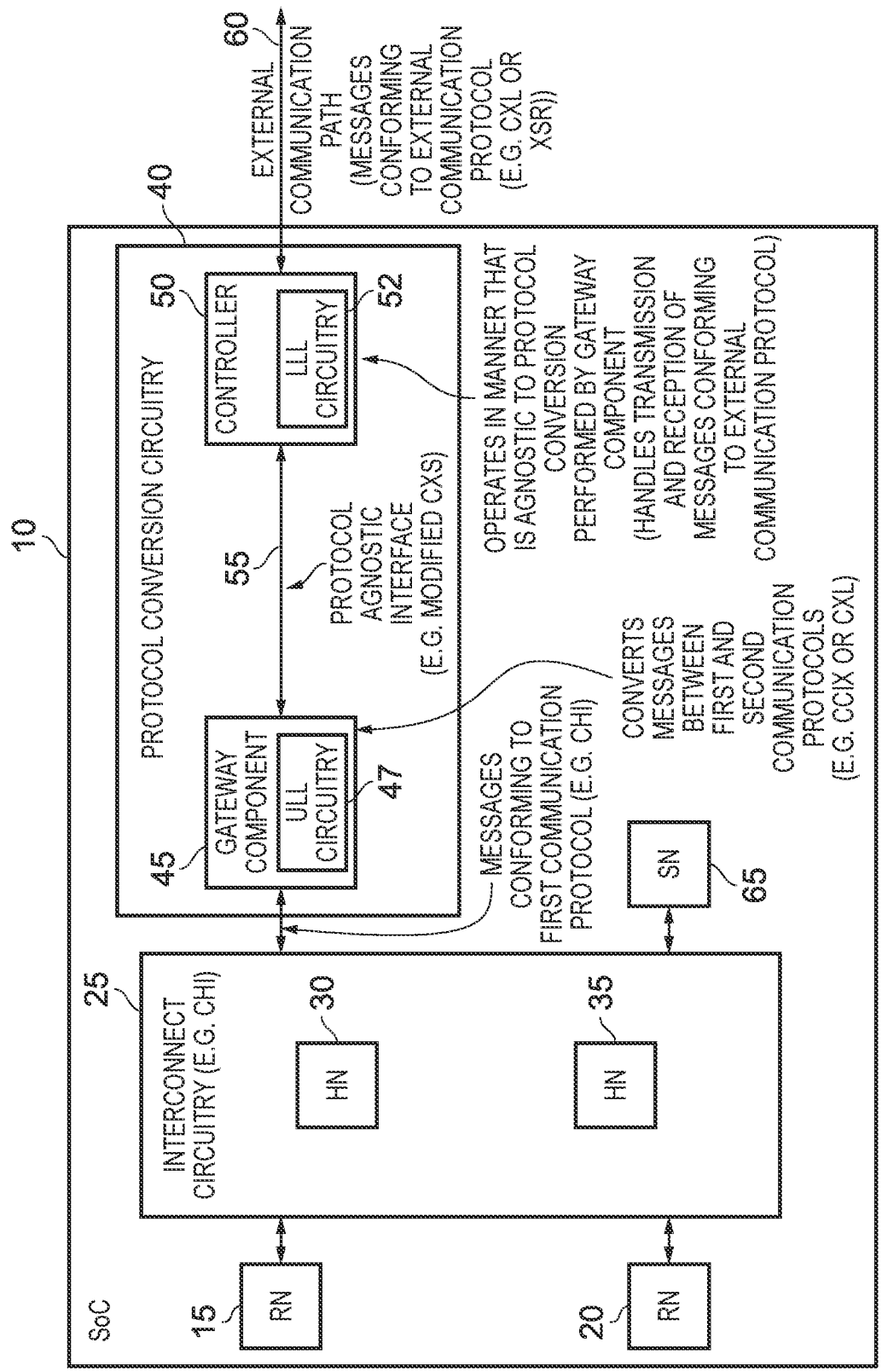
FIG. 1 is a block diagram of an integrated circuit in accordance with one example implementation.

In accordance with one example arrangement an apparatus is provided that has interconnect circuitry for routing messages between components coupled to the interconnect circuitry. The messages routed over the interconnect circuitry are arranged to conform to a first communication protocol that is associated with the interconnect circuitry. The apparatus further has protocol conversion circuitry that is coupled between the interconnect circuitry and an external communication path. This protocol conversion circuitry is used to convert messages that are routed through it between the first communication protocol and a second communication protocol.

The protocol conversion circuitry is arranged to comprise a gateway component that forms one of the components coupled to the interconnect circuitry, and a controller that is coupled with the gateway component and used to control connection with the external communication path.

The second communication protocol has a layered architecture comprising multiple layers. Many standard bus architectures are defined as layered architectures, including layers such as a protocol layer, transaction layer, data link layer, and physical layer, with each layer given certain responsibilities. The gateway component may be used to implement one or more of the higher layers of the second communication protocol, whilst the controller implements one or more of the lower layers, and prior to the development of the present technique both of those components would typically need to implement functionality that is dependent on the specific second communication protocol in question.

However, in accordance with the techniques described herein, the protocol conversion circuitry is arranged, for a selected layer of the multiple layers, to provide within the gateway component upper selected layer circuitry to implement a first portion of functionality of the selected layer, with that first portion comprising at least protocol dependent functionality of the selected layer. Further, the protocol conversion circuitry provides within the controller lower selected layer circuitry to implement a remaining portion of the functionality of the selected layer, with that remaining portion comprising only protocol independent functionality of the selected layer.

Hence, for a chosen layer of the layered architecture forming the second communication protocol, the functionality of that layer is split between the gateway component and the controller, so as to ensure that any protocol dependent functionality of that selected layer is performed within the gateway component. The controller can then be arranged solely to implement one or more functions of the selected layer that are protocol independent. It has been found that by such an approach this can result in significant efficiency benefits when designing protocol conversion circuits, and also provide a great deal of flexibility with regards to the use of components to form such protocol conversion circuitry.

For example, whilst the second communication protocol used by the gateway component can be the same as the communication protocol used by the external communication path, there is no longer a requirement for this, since the controller can be developed in a manner that is agnostic to the content of the messages that it is seeking to transport over the external communication path. Hence, by way of example, such an approach can allow a gateway component to be designed that can be configured to employ any one of multiple different second communication protocols, whilst still enabling the same controller component to be coupled to it to handle the transport of messages over the external communication path. The communication protocol used over the external communication path may for example be one of those multiple second communication protocols or instead, due to the inherent flexibilities introduced by the splitting of the selected layer functionality described above, the external communication path can use a yet further communication protocol different to any of the second communication protocols supported by the gateway component.

The choice of selected layer may depend on implementation. However, in accordance with one example implementation, the layered architecture of the second communication protocol includes a data link layer, and it is the data link layer that is chosen as the selected layer. The upper selected layer circuitry can then be viewed as upper link layer circuitry and the lower selected layer circuitry can be viewed as lower link layer circuitry. In such an implementation, all of the protocol dependent functionality of the data link layer can be incorporated within the gateway component, and the gateway component can then also be arranged to handle functionality of all of the higher layers of the layered architecture above the data link layer. In contrast, the controller will only implement protocol independent functionality of the data link layer, along with functions required by the lower layers of the layered architecture.

As a result, whilst the controller will be arranged to transport messages over the external communication path having regard to the protocol used by the external communication path, it does not require any knowledge of the content of the messages being transported, and hence can be arranged to be protocol agnostic to the second communication protocol employed by the gateway component. As discussed earlier, this provides a great deal of flexibility when producing protocol conversion circuits, for example by allowing the controller element to be reused in multiple different situations. This in turn significantly improves the efficiency of designing protocol conversion circuits.

In one example implementation, the protocol conversion circuitry further comprises a protocol agnostic interface between the gateway component and the controller for exchange of messages between the gateway component and the controller, the protocol agnostic interface enabling operation of the controller in a manner that is unconstrained by the second communication protocol. The actual content within the messages that are passed over the protocol agnostic interface will be dependent on the second communication protocol employed within the gateway component, in that the upper selected layer circuitry within the gateway component will generate outgoing messages and process incoming messages in a manner that is dependent on the second communication protocol. However, through use of the protocol agnostic interface, the lower selected layer circuitry within the controller does not need to understand the content of those messages in order to process them, and can operate in a manner that is agnostic to the protocol used to generate the content of those messages. The controller will still be protocol aware in some sense, as the manner in which the actual physical communication over the external communication path is performed will be dependent on the communication protocol used by that external communication path. However, due to the protocol agnostic interface, there is no dependency between the communication protocol used on the external communication path and the second communication protocol processed by the gateway component, allowing the controller to be used in a wide variety of different situations.

By way of example, if in a particular implementation it is the case that the second communication protocol employed by the gateway component is in fact the communication protocol used over the external communication path, then the controller's operation will naturally include knowledge of the second communications protocol, in particular the knowledge required to communicate messages over the external communication path in a manner that conforms to that second communication protocol, but the controller does not need to have any knowledge of the actual content of the individual messages being transported. Hence, if in fact the external communication path uses a different protocol to the second communication protocol, then a controller that is designed to transport messages using the communication protocol for the external communication path can also handle messages received from a gateway component that uses the second communication protocol, and will reliably transport messages whose content conforms to that second communication protocol over the external communication path.

As such, it is clear that through use of the protocol agnostic interface the operation of the controller can be performed in a manner that is unconstrained by the second communication protocol employed within the gateway component. It should be noted that that operation of the controller is also unconstrained by the first communication protocol employed by the interconnect circuitry.

The protocol agnostic interface can be arranged in a variety of ways. However, in one example implementation the protocol agnostic interface is arranged to employ a messaging protocol that enables the controller to process the messages without knowledge of the communication protocol that is used to form those messages. As will be discussed in more detail later, in some implementations the messaging protocol can be arranged so as to ensure one or more items of metadata are provided in association with certain messages to provide the controller with information sufficient to enable it to process those messages without knowledge of the content of those messages. A particular example of such metadata may be a last message flag to identify the last message within a packet being transferred over the interface.

As mentioned earlier, by splitting the functionality of the selected layer of the second communication protocol between the gateway component and the controller component in the manner described earlier, thereby allowing the controller's functionality to be agnostic to the second communication protocol used by the gateway component, this allows a great deal of flexibility in how the various components may be used. For example, in one implementation the external communication path may operate in accordance with the second communication protocol, and hence the controller can be designed to transport messages across the external communication path in accordance with the second communication protocol. However, as noted earlier, due to the way the controller is constructed, and in particular due to the way the functionality of the selected layer is split between the gateway component and the controller, the controller can operate in a manner where it does not need to have knowledge of the contents of the messages it is transporting, and accordingly those contents can be constructed in accordance with a different protocol to the protocol used by the external communication path.

Hence, in such examples the external communication path may operate in accordance with a further communication protocol. In this case, the protocol agnostic interface enables the controller to handle transport of the messages over the external communication path in a manner conforming to that further communication protocol, despite the fact that the content of the messages passed over that protocol agnostic interface are formed using the second communication protocol. This provides a great deal of flexibility in the choice of communication protocols used over the external communication path, and hence can enable protocol messages generated and handled by the gateway component of the protocol conversion circuitry to actually be transported over the external communication link using a protocol of a different technology, thus enabling the most appropriate transport mechanism over the external communication path to be chosen for a particular implementation, independent of whether the content of the underlying messages being transported actually conform to that protocol or a different protocol.

In one example implementation, the protocol conversion circuitry is arranged to support conversion of messages between the first communication protocol and a selected one of multiple second communication protocols. This can be achieved by arranging the gateway component to have protocol specific circuitry to process messages conforming to each of the multiple second communication protocols. In one example implementation, the gateway component can then be configured in use to select one of the available second communication protocols that it supports. Furthermore, because the controller is arranged in a manner that is agnostic to the particular second communication protocol used, the controller of the protocol conversion circuitry can be provided with generic circuitry that is agnostic to the second communication protocol selected for the gateway component, and in particular is agnostic to which of the multiple second communication protocols the messages processed by the controller conform to. This provides a great deal of flexibility, and also efficiency benefits when designing protocol conversion circuits. In particular, a common gateway block can be designed that is able to support a number of different second communication protocols, with the choice of which second communication protocol to employ within the gateway block then being selectable in use, and irrespective of which second communication protocol is chosen, the same controller component can be coupled to the gateway block to form the protocol conversion circuitry.

If desired, one or more further protocol conversion circuits can be provided by the apparatus, where each further protocol conversion circuit comprises a further gateway component, but where the multiple different protocol conversion circuits can be arranged to share the controller. This benefit arises from the fact that the controller can now operate in a manner that is agnostic to the protocol that is being used to form the messages passing between the gateway components and the controller.

The messages that are transferred within the apparatus can take a variety of forms, and in one example implementation multiple messages can be grouped together into packets. Hence, by way of example, the messages transferred over the protocol agnostic interface may form packets, with each packet comprising one or more messages. In some instances, it may be desirable for the controller to be able to identify the boundaries between packets, but as discussed earlier the controller in accordance with the present technique has been designed so as to be protocol agnostic, and in particular to not require knowledge of the contents of the messages being transferred.

To alleviate this issue, in accordance with one example implementation the messaging protocol used by the protocol agnostic interface is such that a final message in each packet is accompanied by a last message flag. The lower selected layer circuitry within the controller may be arranged to perform one or more functions that require, in the presence of a trigger condition, generation of one or more additional packets to insert within a sequence of packets to be transmitted between the gateway component and the external communication path. The presence of the above-mentioned last message flag enables the lower selected layer circuitry to determine boundaries between packets without knowledge of the contents of each message, and hence enables the controller to determine when the one or more additional packets can be inserted without risk of corrupting the packets being transferred between the gateway component and the external communication path.

As mentioned earlier, in some example implementations there may be at least one further protocol conversion circuit provided by the apparatus. One or more of those further protocol conversion circuits may comprise a further gateway component but may be arranged to share the controller with one or more other protocol conversion circuits. In one such example interpretation, the controller is arranged to implement multiple protocol stacks, comprising a first protocol stack that incorporates the lower selected layer circuitry and is used to process messages passed between the controller and the gateway component of the protocol conversion circuitry, and an additional protocol stack provided for each further protocol conversion circuitry to process messages passed between the controller and the further gateway component of that further protocol conversion circuitry. In such an implementation, the protocol agnostic interface can be used to communicate between the controller and each of the various gateway components of the multiple protocol conversion circuits.

In one example implementation, in order to assist in the routing of messages between the controller and the various gateway components, the messages transferred over the protocol agnostic interface can be arranged to have a type flag associated therewith that is used to determine which protocol stack those messages relate to. As with the earlier-mentioned last message flag, the use of such a type flag can assist in allowing the controller to operate in a protocol agnostic manner and in particular avoid the controller needing to have any knowledge of the contents of individual messages processed by it.

As mentioned earlier, in one example implementation the selected layer whose functionality is split between the gateway component and the controller is the data link layer. It has been found that this provides a suitable layer in which to achieve the desired split in the functionality, and thereby allow the controller to operate in a protocol agnostic manner with regard to the protocol conversion performed by the associated gateway component. In particular, the functionality required by the data link layer can be separated into functions that are protocol dependent and those that are not, hence allowing the protocol dependent functions to be performed within the gateway component. In one example implementation, the first portion of the functionality of the data link layer implemented by the upper link layer circuitry in the gateway component comprises at least a protocol dependent message processing operation to handle the creation of content of the messages and the packing and unpacking of those messages into packets, and a flow control operation to manage the transfer of the messages through the protocol conversion circuitry. Hence, the protocol dependent message processing operation can for example be used to handle flit formation and the packing and unpacking of messages into and from packets. The flow control operation can then be used to manage functions such as when and how much data to send, for example using mechanisms such as credit control mechanisms, and can employ any required handshake mechanisms to control the transfer of messages through the protocol conversion circuitry, for example by use of request/acknowledge signals. The above mentioned operations are inherently protocol dependent, and in accordance with the techniques described herein will be performed within the upper link layer circuitry of the gateway component.

In one example implementation, the remaining portion of the functionality of the data link layer implemented by the lower link layer circuitry in the controller comprises one or more operations that seek to ensure reliable transmission of the messages via the external communication path. As an example, the one or more operations that are performed to seek to ensure reliable transmission of messages may comprise an initialisation operation to establish communication over the external communication path, an error checking operation performed in respect of the messages, and/or a retry operation to control selective resending of messages. These functions can be provided by the controller in a way that is entirely agnostic to the content of the messages being transported and hence in a way that is agnostic to the second communication protocol used by the associated gateway component.

It will be appreciated that in accordance with the techniques described herein, data link layer functionality that may previously have been implemented within a controller component is instead split, with the protocol dependent functionality of the data link layer being moved into the gateway block. Due to this migration of functionality, then any other higher layers in the protocol that may previously have been considered appropriate to perform within the controller will also be moved into the gateway block, for example a transaction layer. In addition to the benefits already discussed resulting from the split of the data link layer functionality between the gateway block and the controller, other benefits can also arise as a result of the above described mechanism. For example, the upper link layer circuitry in the gateway component can be arranged to share buffer resources with additional circuitry implementing one or more layers of the layered architecture higher in the layered architecture than the data link layer. For instance, implementing the upper link layer functionality closer to the transaction and protocol layers can enable better usage of buffer resources, and in addition can hide latency when processing protocol messages. Further, it has been found that some of the protocol functionality, such as enforcing ordering rules as well as providing forward progress guarantees, can be more efficiently implemented when provided by circuitry closer to the protocol layer, as is achieved by providing the upper link layer functionality and any higher layer functionality within the gateway component.

The first and second communication protocols can take a variety of forms, but in one example implementation the first communication protocol is a proprietary on-chip bus protocol, whilst the second communication protocol is a standard off-chip bus protocol. An example of a suitable proprietary on-chip bus protocol would be the AMBA 5 CHI (Coherent Hub Interface) protocol developed by Arm Limited, Cambridge, United Kingdom. An example of a standard off-chip bus protocol that can be used as the second communication protocol may be the CCIX (Cache Coherent Interconnect for Accelerators) protocol, which is often used for multi-chip communication and can be used to simplify communication between a central processor and accelerators through a cache coherent extension to the PCIe (Peripheral Component Interconnect Express) Standard. As another example, the second communication protocol may be the Compute Express Link (CXL) protocol which provides a high-bandwidth, low-latency serial bus connection between host processors and devices such as accelerators, memory controllers/buffers and I/O devices. CXL is based on the PCIe physical layer.

However, as mentioned earlier, due to the protocol agnostic nature of the controller, gateway blocks designed for handling CCIX, CXL, or other protocols can be coupled to controllers that provide a physical connection over the external communication path conforming to any other desired protocol. By way of specific example, the controller may be designed to use the XSR (Extremely Short Reach), protocol to provide fast die-to-die connections.

The messaging protocol employed by the protocol agnostic interface can take a variety of forms, but in one example implementation is a point-to-point streaming protocol. As a particular example, the AMBA CXS protocol specification developed by Arm Limited can be used to form the messaging protocol employed by the protocol agnostic interface. In some example implementations, this protocol can then be extended to provide some additional information, such as the earlier-mentioned last message flag and/or type flag.

FIG. 1 is a block diagram of an apparatus in accordance with one example implementation. In this example the apparatus takes the form of an integrated circuit, for example a System-on-Chip (SoC) 10. Within the SoC 10 interconnect circuitry 25 is provided for interconnecting a number of components 15, 20, 40, 65 that are connected to the interconnect. The interconnect circuitry can use any suitable topology, and hence for example could be arranged with a crossbar topology, a ring topology or a mesh topology.

The interconnect circuitry will employ a communication protocol for the transfer of messages through the interconnect between the various connected components. The communication protocol used by the interconnect circuitry can take a variety of forms, but in one example implementation is a proprietary on-chip bus protocol, such as the earlier-mentioned AMBA 5 CHI protocol developed by Arm Limited, United Kingdom.

The various components coupled to the interconnect can take a variety of forms, with examples being illustrated in FIG. 1. In particular, request nodes (RNs) 15, 20 can be provided for generating protocol transactions, including read and write transactions, for input to the interconnect 25. One or more home nodes (HNs) 30, 35 can be provided within the interconnect to receive such protocol transactions from request nodes, complete any required coherency action, and return a response. In turn, one or more slave nodes (SNs) 65 may be connected to the interconnect for receiving requests from one of the home nodes 30, 35, completing the required action specified by those requests, and then returning a response, typically via the home node.

As shown in FIG. 1, protocol conversion circuitry 40 may be provided as an intermediate gateway node to handle requests that require communication over an external communication path 60 with one or more other entities provided within the system incorporating the SoC 10. The external communication path 60 may connect to a specific device, or indeed may connect to another subsystem, for example an integrated circuit comprising a number of other components. The protocol conversion circuitry 40 may act as a proxy for all of the RNs 15, 20 when communicating with home nodes on a remote chip over the external communication path 60, or may act as proxy for home nodes 30, 35 when communicating with slave nodes on such a remote chip 10.

Messages transferred over the external communication path will conform to a communication protocol provided for that external communication path, and typically this will differ from the communication protocol used by the interconnect circuitry 25. Whilst the communication protocol used by the external communication path can take a variety of forms, in one example implementation it may be a standard off-chip bus protocol, examples being the earlier-mentioned CCIX, CXL or XSR protocols.

Due to the different communication protocol used by the external communication path, the protocol conversion circuitry 40 is required in order to support the transfer of messages between the interconnect circuitry 25 and the external communication path. In accordance with the techniques described herein, the protocol conversion circuitry 40 includes both a gateway component 45 that may be connected to the interconnect, and a controller 50 that is coupled to the gateway component 45 via an interface 55, and which is used to control connection with the external communication path 60. The protocol conversion circuitry 40 is used to convert messages between the communication protocol used by the interconnect 25 and a further communication protocol. Typically this further communication protocol would be the communication protocol used for communicating over the external communication path 60, but as will be apparent from the discussions herein the manner in which the gateway component 45 and controller 50 are constructed enables a great deal of flexibility in this respect, and hence whilst the further communication protocol may indeed be the protocol used for the external communication path, this is not a requirement.

Herein, the communication protocol used by the interconnect circuitry will be referred to as the first communication protocol, and the further communication protocol that the gateway component 45 implements conversion to and from will be referred to as the second communication protocol. Hence, the gateway component 45 can be arranged to receive from the interconnect circuitry 25, and transmit to the interconnect circuitry, messages conforming to the first communication protocol (e.g. CHI), and can be arranged to convert messages between that first communication protocol and a second communication protocol, which may for example be the earlier-mentioned CCIX protocol or CXL protocol.

Typically, the second communication protocol will have a layered architecture, as indeed may the first communication protocol. Considering the multiple layers of the second communication protocol, it would typically be the case that the functionality of those layers were spread between the gateway component 45 and the controller 50, with both the gateway component 45 and the controller 50 being designed having regards to the specific second communication protocol in question. Hence, the gateway component might have been arranged to handle the higher layers of the second communication protocol, whilst the controller might have been arranged to handle the lower layers, typically including not only the physical layer, but also the data link layer and potentially also the transaction layer. As a result, when designing a protocol conversion circuit for a specific second communication protocol, both the gateway component 45 and the controller 50 would have to have been designed to implement functionality specific to the second communication protocol in question. This would result in the implementation of a "per protocol standard" bridging/interface block to form the gateway component connected to the interconnect circuitry, and similarly a "per protocol" controller block 50 to implement connection to the external communication path. This can result in significant complexities when designing protocol conversion circuits, due to the need to provide protocol specific solutions for both the gateway component and an associated controller.

Furthermore, each of the protocol standards that may be used for the second communication protocol may define their own message handling rules at the protocol/transaction layer, and these may include ordering rules between the same and different message types, and forward progress guarantees with respect to different message types, etc. As a result, the interface between a gateway component and the controller is typically protocol specific. Further, such complexities are compounded by the fact that the gateway component may typically be designed by the entity designing the interconnect circuitry, whereas the controller may be designed by a separate entity.

In order to seek to alleviate these complexities, the technique described herein proposes a different approach, that enables the controller 50 to operate in a manner that is agnostic to the way in which the messages are created/processed within the gateway component 45, and hence which is agnostic to the second communication protocol implemented within the gateway component. To facilitate this arrangement, a protocol agnostic interface 55 may be provided between the gateway component 45 and the controller, so as to enable the controller to handle messages transferred through it without needing to have any knowledge of the content of those messages. Hence, the controller can merely interface with the external communication path in order to transport messages over the external communication path in accordance with the protocol supported via that communication path irrespective of whether the messages themselves actually contain content that conforms to that communication protocol of the external communication path. This can provide a great degree of flexibility in how gateway components and controllers are coupled together to form protocol conversion circuits, and simplify the design process when developing new protocol conversion circuits.

Further, to achieve the above aims, a selected layer within the second communication protocol is identified whose functionality can be split between the gateway component and the controller. In particular, a split of the functionality of that selected layer is such that any protocol dependent functionality of that selected layer can be provided within the gateway component, with the controller then implementing only protocol independent functionality of that selected layer.

The selected layer may vary dependent on implementation, but in the examples envisaged herein the selected layer is the data link layer, and the gateway component 45 includes upper link layer (ULL) circuitry 47 to implement a first portion of functionality of the data link layer, that first portion comprising at least any protocol dependent functionality of the data link layer. Within the controller 50, lower link layer (LLL) circuitry 52 is then provided that implements the remaining portion of the functionality of the data link layer, where that remaining portion comprises only protocol independent functionality of the selected layer, and hence implements only functionality of the data link layer that is independent of the second communication protocol used within the gateway component 45.

The messages transferred between the gateway component 45 and the controller 50 over the protocol agnostic interface 55 are arranged such that the controller does not need to have any knowledge of the content of the messages that are processed by it. The messaging protocol used by the protocol agnostic interface can take a variety of forms, but in one example is a point-to-point streaming protocol, such as the CXS protocol developed by Arm Limited, United Kingdom. In one particular implementation, that CXS protocol can be extended to include some additional flags that can be passed in association with certain messages to ensure that the controller can operate independently of any knowledge of the content of the individual messages.

This means for example that the controller 50 only needs to be arranged to handle the reliable transport over the external communication path of messages in a manner that conforms to the external communication protocol used in the external communication path. In one example implementation, this involves performing protocol agnostic functions of the data link layer that are aimed at ensuring reliable transmission of messages via the external communication path, along with implementation of the physical layer connections to the external communication path.

By such an approach, a controller developed to connect to a particular external communication path protocol can be used independently of the protocol conversion being performed by the gateway component. Hence, by way of specific example, irrespective of whether the gateway component is converting between CHI and CCIX, or between CHI and CXL, a controller defined for interfacing with an external communication path using CXL can be used, since the controller 50 does not need to know whether the content of the individual messages has been constructed in accordance with the CCIX standard or the CXL standard. As another example of the inherent flexibility resulting from such an approach, a controller 50 designed for interfacing with an external communication path using the XSR protocol can also be used to transport messages produced by a gateway component that converts between CHI and CCIX or between CHI and CXL, since again the controller does not need to know any information about the content of the messages that it is transporting. This can provide a great deal of flexibility in the choice of external communication path and associated communication protocol to be used in any particular implementation.

Figure 2:
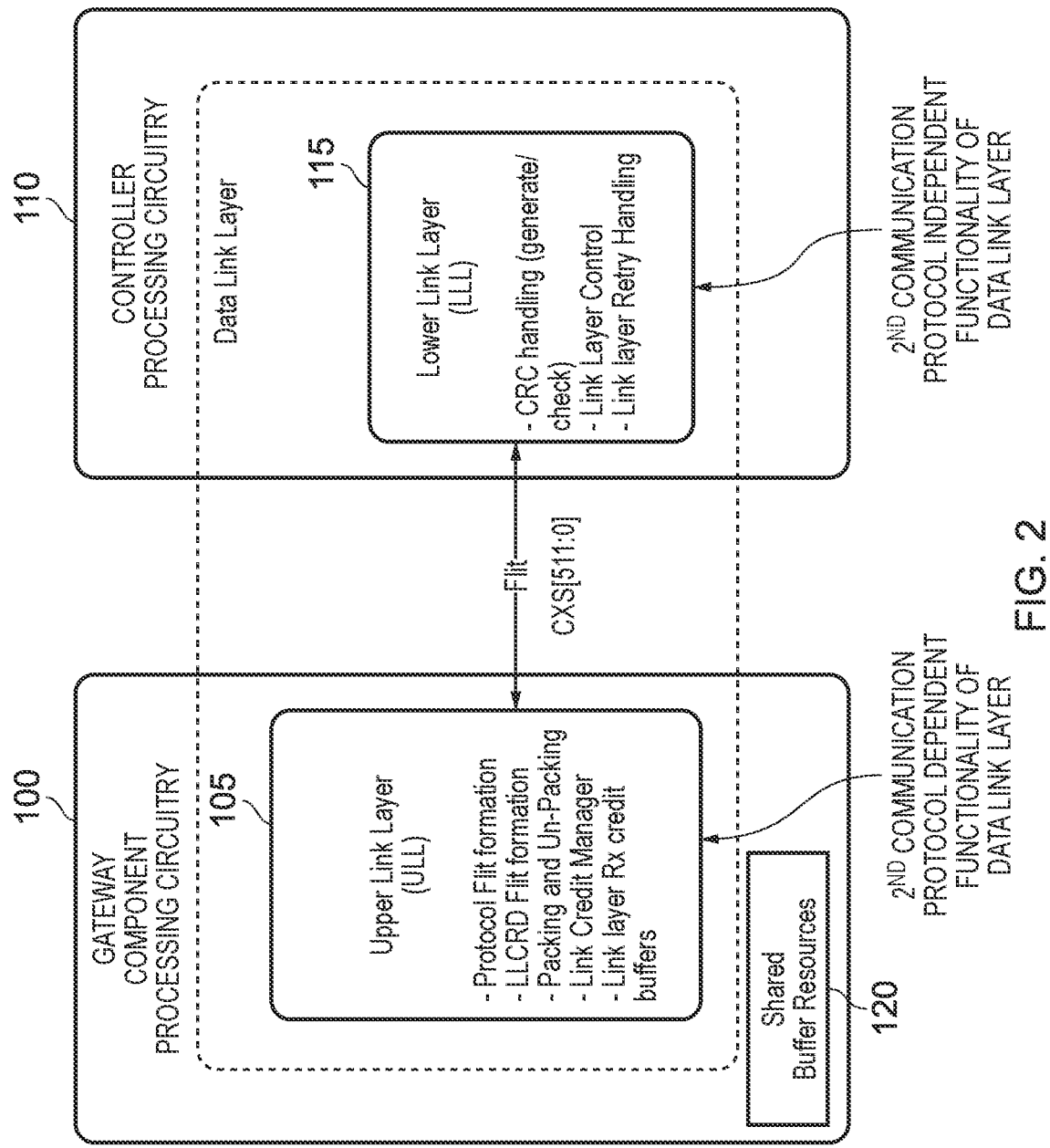
FIG. 2 schematically illustrates how the functionality of the data link layer may be split between the gateway component and the controller component of the protocol conversion circuitry of FIG. 1 in accordance with one example arrangement.

FIG. 2 is a diagram illustrating in more detail the functionality of provided within the upper link layer and the lower link layer circuits provided within the gateway component and controller, respectively. In particular, as part of the gateway component processing circuitry 100, upper link layer processing circuitry 105 may be provided, and similarly within the controller processing circuitry 110 lower link layer processing circuitry 115 may be provided. Collectively, the functions performed by the upper link layer circuitry 105 and the lower link layer circuitry 115 implement the data link layer of the second communication protocol, but those functions are split between the gateway component and the controller.

The messages transferred over the interface between the gateway component 45 and the controller 50 can be formed into packets, where each packet may comprise one or more messages. Within the data link layer, the smallest flow control unit is referred to as a flit, and a packet can be made up of one or more flits. All the flits of a given packet follow the same path. The responsibility of the data link layer is to guarantee reliable transmission of protocol messages over the associated communication link, and it is also responsible for link layer flow control and link management. It has been found that the functionality related to the reliable transmission of the messages can be organised in a way that is agnostic to the actual protocol used to create the individual messages. In contrast, other functions such as message creation and flow control are protocol specific. Accordingly, as shown in FIG. 2, the upper link layer circuitry 105 can be arranged to perform operations that are protocol specific, whilst the lower link layer circuitry 115 can be used to handle functionality relating to the reliable transmission of messages via the external communication path.

Hence, the upper link layer circuitry 105 can perform one or more protocol dependent message processing operations to handle the creation of content of the messages, and hence handle the formation of the individual flits. As shown in FIG. 2, these may be both protocol flits defining actual message content to be passed as packets, and related flow control flits such as the link layer credit (LLCRD) flits. The protocol dependent message processing operations may also involve packing and unpacking operations used to construct packets from the various flits, and to deconstruct received packets into the constituent flits. In addition, the upper link layer circuitry may perform flow control operations to manage the transfer of messages through the protocol conversion circuitry, in order to control when and how much data to send, using credit control mechanisms, handshake mechanisms, etc.

In contrast, the lower link layer circuitry 115 can perform protocol agnostic functions, i.e. functions that are agnostic to the protocol used to produce the messages to be transferred over the external communication path. These operations can comprise an initialisation operation to establish communication over the external communication path, referred to in FIG. 2 as link layer control functions, an error checking operation performed in respect of the messages being sent, referred to in FIG. 2 as CRC handling, and one or more retry operations to control selective resending of messages when required.

By moving the protocol dependent functionality of the data link layer into the gateway component, along with any higher level layers that might previously have been handled by the controller, this allows the controller to be constructed in a more generic manner so that it can be reused irrespective of the second communication protocol being used to define the contents of the individual messages. In addition to these benefits, the provisioning of the upper link layer circuitry 105 within the gateway component can also give rise to further benefits. In particular, implementing the ULL circuitry closer to the transaction and protocol layers enables better usage of buffer resources, and can also hide latency when processing protocol messages. Hence, shared buffer resources 120 can be provided within the gateway component that can be utilised by both the upper link layer circuitry 105, and by circuitry performing functions of other higher layers, such as the transaction layer and the protocol layer. Further, it has been found that some of the protocol functionality, such as the enforcing of ordering rules as well as the provision of forward progress guarantees, can be better implemented closer to the protocol layer of the interconnect, and hence these benefits are also realised by providing the upper link layer circuitry, along with circuitry required for the higher layers, within the gateway component.

Figure 3A:
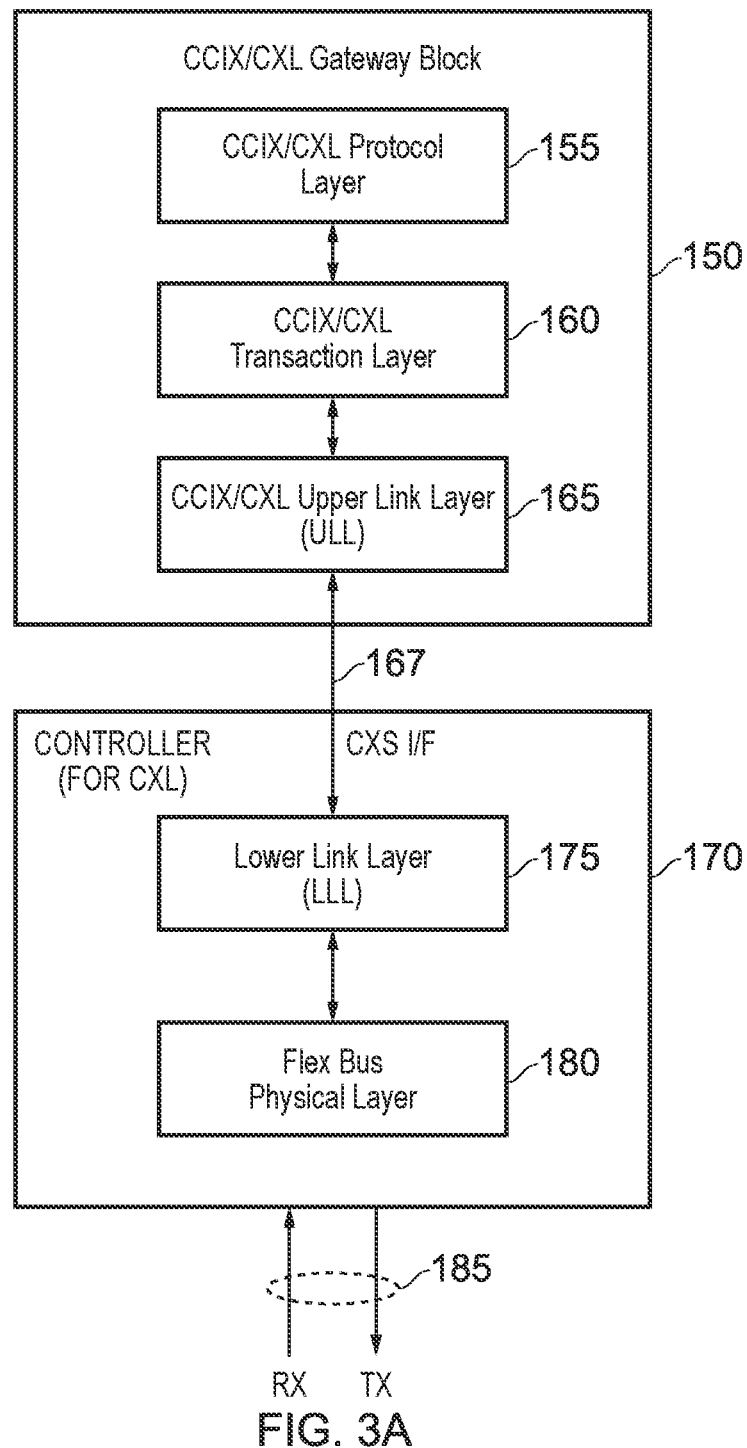
FIG. 3A illustrates a gateway block and a controller block that may be provided in accordance with one example implementation.

FIG. 3A schematically illustrates the use of the upper link layer and lower link layer for a particular example scenario. In this example scenario, the gateway block 150 includes protocol specific circuitry that can process messages conforming to a number of different second communication protocols. In particular, the gateway block 150 is in this example considered to be a CCIX/CXL gateway block, and hence when provisioned in a particular system its function can be selected to either perform conversion between the associated interconnect's communication protocol and CCIX, or between the associated interconnect's communication protocol and CXL. This configuration of the gateway block 150 can for example be performed by software during initial system bring up or boot up. Hence, the gateway block 150 can be provided with protocol layer components 155, transaction layer components 165 and upper link layer components 165 that can be configured to perform either CCIX protocol conversion or CXL protocol conversion.

Irrespective of how the gateway block is configured, communication with the controller 170 can occur via a protocol agnostic interface 167, which as mentioned earlier in one example implementation can be based on the CXS protocol. The lower link layer circuitry 175 then performs protocol independent functionality of the data link layer, and hence can perform its functions without requiring any knowledge of how the message contents of the messages transferred over the interface 167 have been formed, and in particular needs no knowledge of the communication protocol used to form those messages.

In this example, it is assumed that the controller 170 is designed for communication over the external communication path using CXL, and hence the external communication path 105 will be based on the CXL protocol. In this example, the controller 170 uses a flex bus physical layer 180, which is essentially a PCIe based physical layer. The same controller 170 can hence be used to interface to the communication path 185 irrespective of whether the CCIX protocol or the CXL protocol is used by the gateway block 150.

Figure 3B:
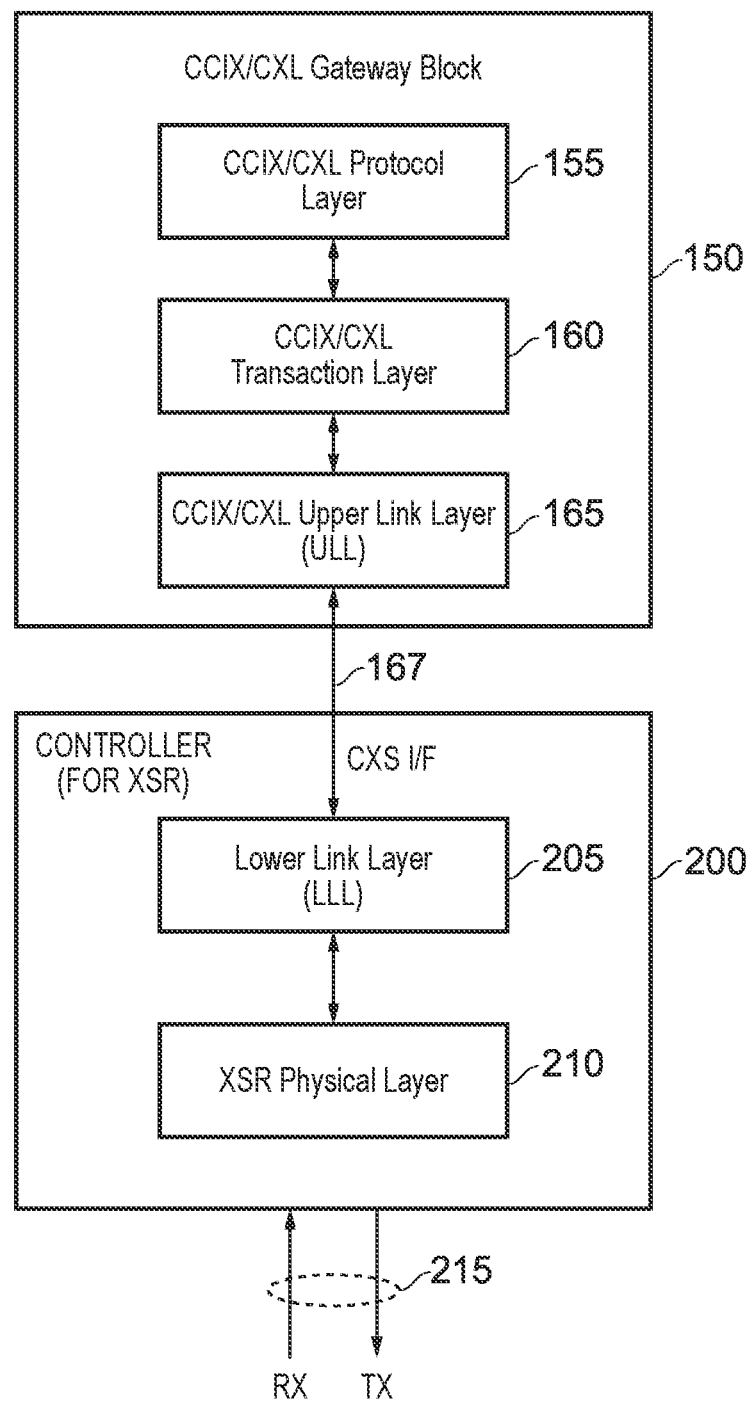
FIG. 3B illustrates a gateway block and a controller block that may be provided in accordance with an alternative example implementation.

In the example of FIG. 3A, the controller 170 is intended to connect to an external communication path 185 that uses one of the protocols supported by the gateway block 150. However, it should be noted that due to the protocol agnostic interface 167 used, the controller does not need to be constrained in this way, and if desired the same CCIX/CXL gateway block 150 could, for example, be connected to a controller designed to interface to an entirely different form of external communication path, as shown for example in FIG. 3B. In this example, the controller 200 is designed to be connected to a communication path 215 using the XSR die-to-die communication protocol. Such an approach can provide a short range, high bandwidth connection between dies or chips within a system. As is apparent from a comparison of FIGS. 3A and 3B, the gateway block 150 is unchanged, and can be configured in use to perform conversion between the communication protocol used by the interconnect circuitry 25 and either CCIX or CXL. However, irrespective of the protocol used to form the individual messages, those messages can be transferred via the controller 200 over the communication path 215 using the XSR communication protocol. At the other end of the communication path 215 a replica of this circuitry can be used to route the messages back through a controller into a suitable gateway block that has knowledge of whether the CCIX or CXL protocol has been used by the gateway block 150.

Figure 4:
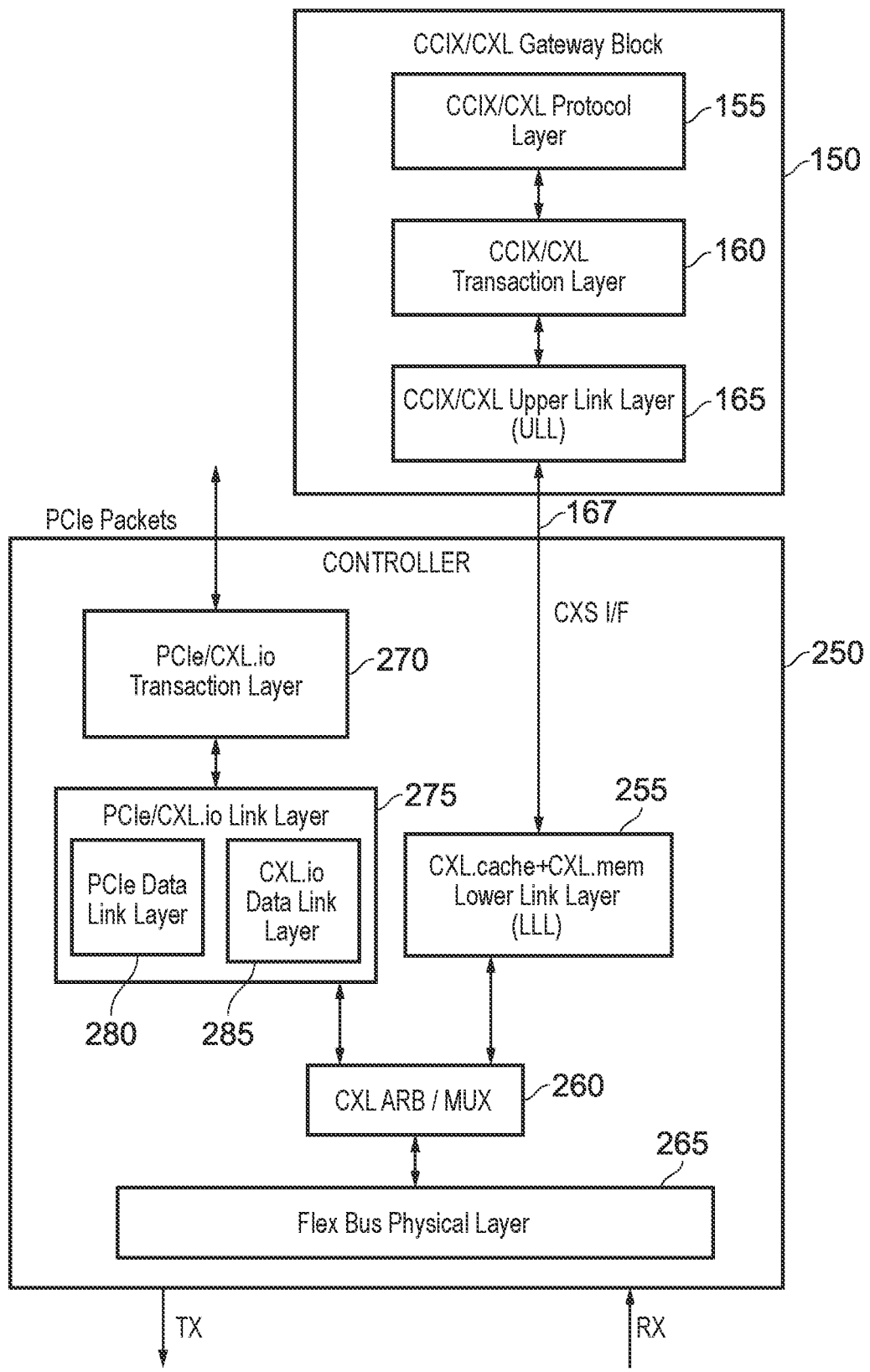
FIG. 4 illustrates how the gateway block may be used with a controller that supports multiple protocol stacks, in accordance with one example implementation.

FIG. 4 is a diagram showing a variant of the arrangement of FIG. 3A, where the controller incorporates additional functionality to support other protocol stacks. In particular, one protocol stack can be envisaged as supporting the gateway block 150 through the provision of the lower link layer 255 and associated physical layer 265. However, another protocol stack can include the components 270, 275 and the physical layer 265 to support transfer of other messages. That protocol stack can, as shown in FIG. 4, receive and transmit PCIe packets, and if desired the path from the controller transporting PCIe packets from the transaction layer 270 can be connected to a bridging block to convert to another protocol, for example the AXI protocol developed by Arm Limited, United kingdom.

As shown in FIG. 4, the controller 250 may still be developed to support CXL, along with more standard PCIe communication, and as shown in FIG. 4 the CXL functionality can be partitioned such that the data link layer is split in the earlier described manner for some parts of the CXL communication but not for others. In particular, the CXL standard defines three protocols that are dynamically multiplexed together before being transported via a standard PCIe physical layer as provided by the physical layer 265 of the controller 250. The CXL.io protocol is essentially a PCIe 5.0 protocol with some enhancements and is used for initialisation, link-up, device discovery and enumeration, and register access. It provides non-coherent load/store interface for I/O devices.

The CXL.cache protocol defines interactions between a host and a device, allowing attached CXL devices to efficiently cache host memory with low latency using a request and response approach. Further, the CXL.mem protocol provides a host processor with access to device-attached memory using load and store commands with the host CPU acting as a master and a CXL device acting as a subordinate, and can support both volatile and persistent memory architectures.

As shown in FIG. 4, the CXL.cache and CXL.mem protocols may be combined and share a common data link and transaction layer, while the CXL.io protocol may have its own data link and transaction layer, as shown by the elements 270, 275 in FIG. 4. In the example shown in FIG. 4, for the CXL.cache and CXL.mem protocols, the earlier described approach of splitting the data link layer into an upper link layer 165 provided within the gateway block and a lower link layer 255 provided within the controller is employed.

Whilst in FIG. 4 the CXL.io and generic PCIe data link layers 285, 280 are handled in the traditional manner, if desired the upper link layer/lower link layer split may also be implemented in connection with such data link layers.

As shown in FIG. 4, when the controller 250 provides multiple different stacks, the CXL arbitration/multiplexing block 260 can be used to arbitrate use of the physical layer 265 by the different protocol stacks, and to multiplex messages received by the physical layer to the appropriate protocol stacks.

As mentioned earlier, the lower link layer circuitry within the controller is responsible for reliable data transfers and link management, and in connection with this functionality may on occasion need to insert its own packets. As discussed earlier, the aim is for the lower link layer not to require any knowledge of the content of the individual messages transferred over the protocol agnostic interface between the gateway component and the controller. However, when inserting its own packet, the controller needs to ensure that the inserted packet is added between existing packets, and not partway through the transfer of a packet. In order to achieve this, in one example implementation the messaging protocol used for the protocol agnostic interface is extended so as to include a last message flag in association with each packet transferred over the protocol agnostic interface. The lower link layer circuitry can then use this information to decide when it can insert its own link packets. This is illustrated schematically in FIG. 5A for the earlier example implementation of FIG. 3B, and in particular shows the lower link layer circuitry 205 being provided with multiplexing circuitry 220 that allows it to selectively insert its own link packets into the communication over the external communication path in dependence upon the last message flags received in association with messages transported over the protocol agnostic interface 167.

This is illustrated by way of example with reference to FIG. 5B. In particular, this illustrates a sequence of packets received over the protocol agnostic interface, where the packets may include one or more messages. In association with the last message of each packet, a CXS last flag is set. Hence, for packet A there are two messages and the CXS last flag is set in connection with the second message. For packet B, there is only one message, and accordingly the CXS last flag is set when that message is sent, for the packet C there are three messages, and accordingly the CXS last flag is set in connection with the third message of that packet, etc. FIG. 5B also shows the outgoing packets to be transported over the external communication path from the controller 200, and shows how the controller may insert its own link packets (identified in FIG. 5B as link packets 1 and 2) at an appropriate point in the stream of packets, without risk of corrupting any of those packets. In particular, the presence of the CXS last flag can be used to determine appropriate points at which the inserted link packets can be added.

In FIG. 5B, the outgoing series of packets is shown schematically, rather than any specific signal names being attributed to those packets, since the actual signals used will depend on the external communication path protocol being used (for example whether it is CXL or XSR).

The controller may need to insert packets for a variety of reasons. As one example, as part of a retry mechanism, the controller may need to issue a retry request over the external communication path to a source of incoming packets to the controller over that external communication path, so as to trigger that source to resend one or more messages. However, any such inserted packet used to identify the retry request needs to be inserted at a packet boundary between the packets emanating from the gateway block that need to be transported over the external communication path.

Figure 5A:
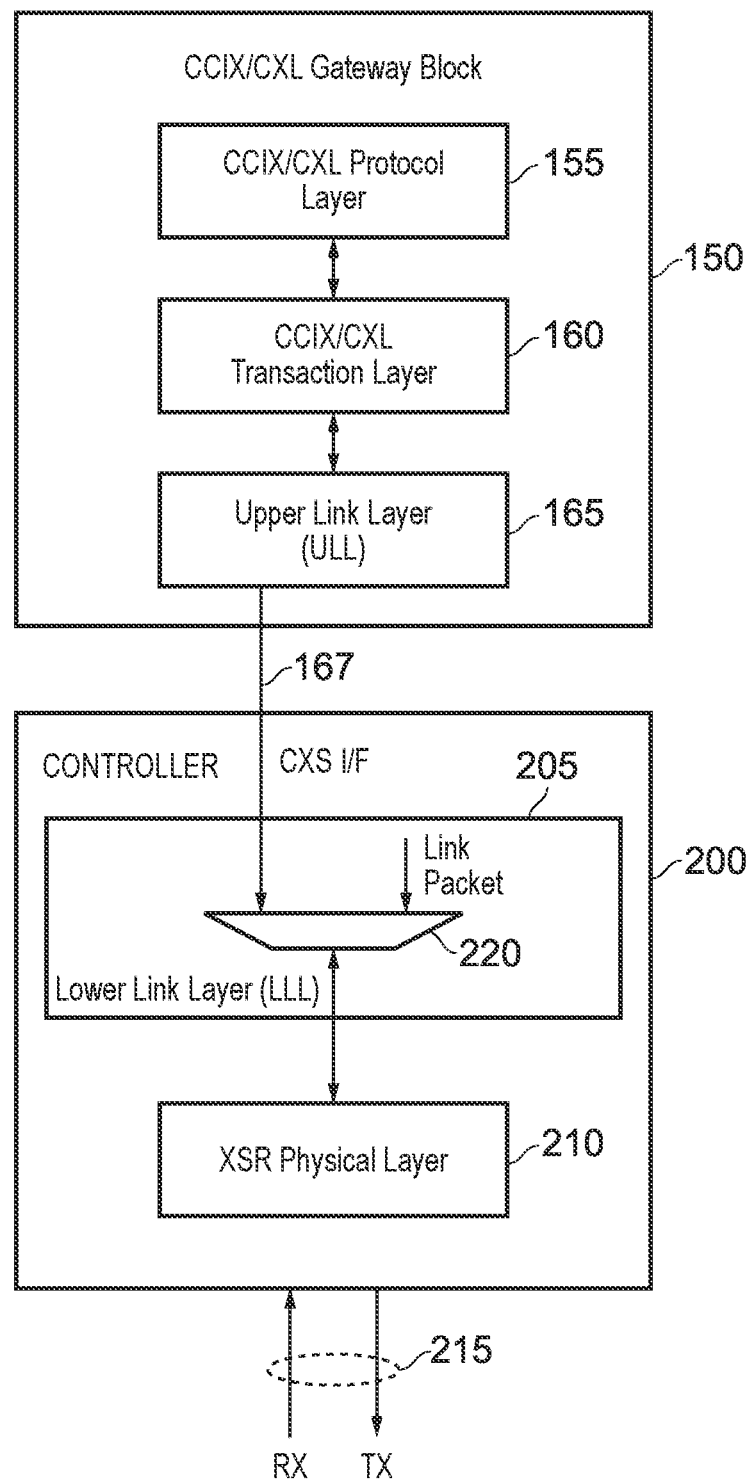
FIG. 5A illustrates how the lower link layer within the example implementation of FIG. 3B may be arranged, in one example implementation, to allow additional packets to be inserted in dependence on a last message flag that may be provided in association with a final message of each packet transferred over the interface between the gateway block and the controller.

Whilst in FIGS. 5A and 5B, the insertion of link packets by the controller is assumed to be in the direction of outgoing messages over the external communication path, in some implementations the CXS last message can also have some utilisation in the reverse direction, i.e. for messages being transferred from the controller to the upper link layer 165 within the gateway block. Typically such a CXS last message is not needed because the gateway block has circuitry that does understand the protocol that has been used to form the messages. However, as one example use case of the CXS last signal in such a direction, the controller 200 may assert the CXS last signal to the upper link layer circuitry 165 in the gateway block 150 in order to seek to terminate transmission of a packet string from the gateway block partway through, due for example to an unexpected drop in the external communication link, or some unexpected reset being performed.

Figure 6:
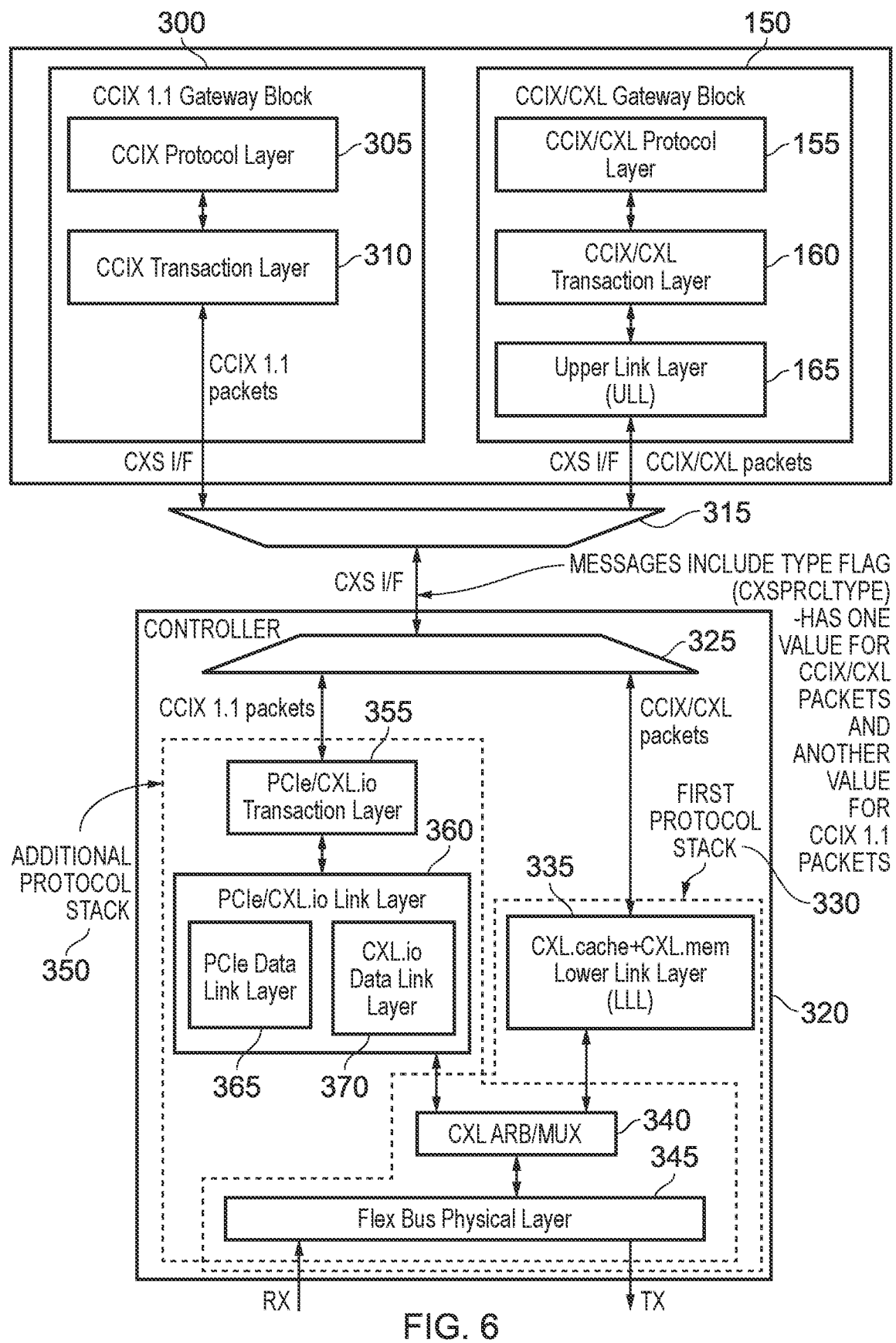
FIG. 6 illustrates an example implementation where the same controller block may be used by multiple gateway blocks, with communication between the multiple gateway blocks and the controller taking place via a common interface.

FIG. 6 illustrates an example of a controller 320 which supports multiple protocol stacks. It will be seen from a comparison of FIG. 6 with the earlier FIG. 4 that the controller 320 takes a similar form to the controller 250 of FIG. 4, but a common interface is used between that controller and multiple gateway blocks 150, 300. As shown, a first protocol stack 330 may consist of the lower link layer 335, arbitration and multiplexer block 340 and physical layer 345, whilst a second protocol stack 350 may consist of the transaction layer 355, link layer 360 (with its associated PCIe and CXL.io data link layer parts 365, 370), arbitration/multiplexer block 340 and physical layer 345. The first protocol stack is used for communications with the gateway block 150, which takes the earlier discussed form and can selectively be configured to perform either CCIX or CXL protocol conversion. Further, the additional protocol stack 350 is used in association with the further gateway block 300 which is a CCIX 1.1 gateway block in this example, and includes a protocol layer 305 and a transaction layer 310.

In accordance with the technique described in FIG. 6, an additional type flag is added in association with messages transported over the common interface, so as to enable a common interface to be used between the controller and the various gateway blocks 150, 300, rather than needing to instantiate separate interface paths between the controller and those gateway blocks. Hence, the multiplexing and demultiplexing components 315, 325 can be used to route messages between the relevant gateway block 150, 300 and the relevant protocol stacks in the controller 320 in dependence on the type flag. In this particular example where the interface is based on the CXS protocol, then this type flag may be referred to as the CXSPRCLTYPE flag, and that flag can have one value to indicate CCIX/CXL packets that should be routed between the gateway block 150 and the first protocol stack 300, and may have another value to identify CCIX 1.1 packets that need routing between the gateway block 300 and the additional protocol stack 350. It will be appreciated that this type flag is hence an example of another piece of metadata that can be associated with the messages transferred over the interface in order to ensure the protocol agnostic nature of that interface, and in particular ensure that the controller does not need to have knowledge of the content of individual messages in order to determine how to process them.

Hence, through use of this protocol type field, a single CXS interface can be used, which is shared between the multiple protocol stacks, and which can be implemented between the gateway blocks and the controller. The CXS interface can be sized to match the bandwidth of the external pins on the physical external communication path if desired.

Figure 7:
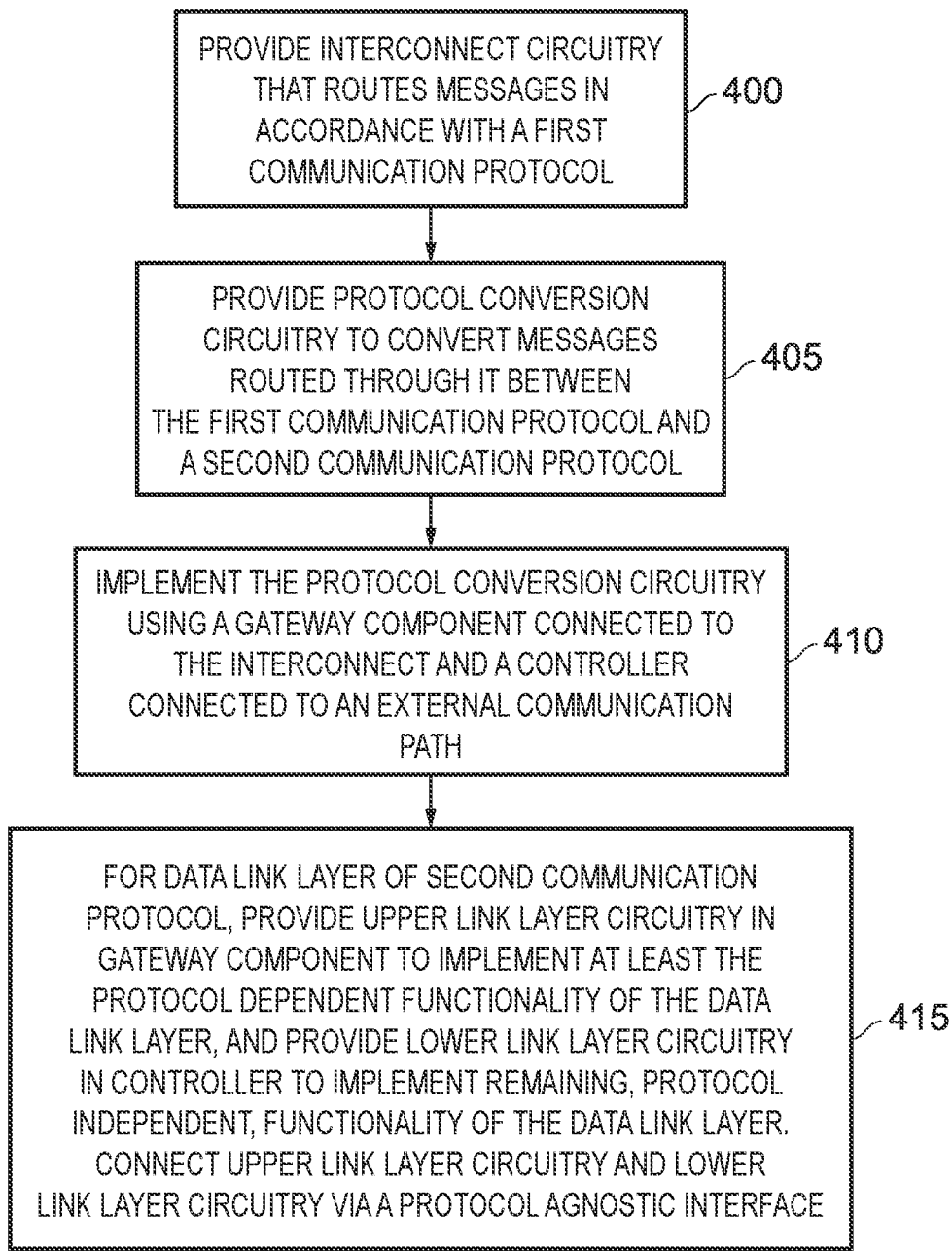
FIG. 7 is a flow diagram illustrating the technique used in one example implementation to handle protocol conversion.

FIG. 7 is a flow diagram illustrating steps performed in accordance with the techniques described herein. At step 400, interconnect circuitry is provided that routes messages in accordance with a first communication protocol, and at step 405 protocol conversion circuitry is provided to convert messages routed through it between the first communication protocol and a second communication protocol.

As indicated by step 410, the protocol conversion circuitry is implemented using a gateway component connected to the interconnected and a controller connected to an external communication path.

Further, as indicated by step 415, for the data link layer of the second communication protocol, upper link layer circuitry is provided in the gateway component to implement at least the protocol dependent functionality of the data link layer. Further, lower link layer circuitry is provided in the controller to implement the remaining protocol independent functionality of the data link layer. The upper link layer circuitry and the lower link layer circuitry are then connected via a protocol agnostic interface.

From the above description of example implementations, it will be appreciated that a number of advantages arise from the use of the techniques described herein. For example, a common lightweight interface can be defined for communicating with a controller block of a protocol conversion circuit. Further, such a common controller block can be used to transport messages conforming to a number of different protocol standards, without needing to alter the operation of that controller. By way of example, as will be apparent from the earlier description, both CCIX and CXL messages can be transported via such a common controller.

Furthermore, a common gateway block can be developed for connection to the interconnect that can communicate protocol messages conforming to multiple different protocols, with the selection of the protocol being available once the gateway block is implemented within a particular circuit (for example by software during initial system bring up or boot up). Hence, a commonly designed gateway block can be configured to communicate either CCIX or CXL protocol messages in accordance with the specific examples described herein.

Furthermore, due to the separation of the data link layer in the manner described herein, the controller block can be constructed using a different communication standard technology if desired, so as to allow, for instance, faster die-to-die communication in the example where the XSR protocol is supported via the controller. In accordance with the techniques described herein, the actual message content transferred by the controller can be constructed using other protocols such as the earlier-mentioned CCIX or CXL protocols.

In addition, it has been found that by processing the messages closer to the higher layers of the protocol, and in particular by providing the upper link layer circuitry within the gateway component, this can help with efficient use of buffer resources, as well as hiding some of the processing latencies that might otherwise occur.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
   interconnect circuitry to route messages between components coupled to the interconnect circuitry, the messages routed over the interconnect circuitry conforming to a first communication protocol; and
   protocol conversion circuitry coupled between the interconnect circuitry and an external communication path, and used to convert messages that are routed though the protocol conversion circuitry between the first communication protocol and a second communication protocol, the second communication protocol having a layered architecture comprising multiple layers;
   the protocol conversion circuitry comprising a gateway component forming one of the components coupled to the interconnect circuitry, and a controller coupled with the gateway component and used to control connection with the external communication path;
   the protocol conversion circuitry being arranged, for a selected layer of the multiple layers, to provide within the gateway component upper selected layer circuitry to implement a first portion of functionality of the selected layer, the first portion comprising at least protocol dependent functionality of the selected layer, and to provide within the controller lower selected layer circuitry to implement a remaining portion of the functionality of the selected layer, the remaining portion comprising only protocol independent functionality of the selected layer.

2. An apparatus as claimed in claim 1, wherein the selected layer is a data link layer, the upper selected layer circuitry is upper link layer circuitry and the lower selected layer circuitry is lower link layer circuitry.

3. An apparatus as claimed in claim 2, wherein the first portion of the functionality of the data link layer implemented by the upper link layer circuitry in the gateway component comprises at least a protocol dependent message processing operation to handle the creation of content of the messages and the packing and unpacking of those messages into packets, and a flow control operation to manage the transfer of the messages through the protocol conversion circuitry.

4. An apparatus as claimed in claim 2, wherein the remaining portion of the functionality of the data link layer implemented by the lower link layer circuitry in the controller comprises one or more operations to seek to ensure reliable transmission of the messages via the external communication path.

5. An apparatus as claimed in claim 4, wherein the one or more operations comprise at least one of an initialisation operation to establish communication over the external communication path, an error checking operation performed in respect of the messages and a retry operation to control selective resending of messages.

6. An apparatus as claimed in claim 2, wherein the upper link layer circuitry in the gateway component is arranged to share buffer resources with additional circuitry implementing one or more layers of the layered architecture higher in the layered architecture than the data link layer.

7. An apparatus as claimed in claim 1, wherein the protocol conversion circuitry further comprises a protocol agnostic interface between the gateway component and the controller for exchange of messages between the gateway component and the controller, the protocol agnostic interface enabling operation of the controller in a manner that is unconstrained by the second communication protocol.

8. An apparatus as claimed in claim 7, wherein the protocol agnostic interface employs a messaging protocol that enables the controller to process the messages without knowledge of the communication protocol used to form those messages.

9. An apparatus as claimed in claim 8, wherein the external communication path operates in accordance with a further communication protocol, and the protocol agnostic interface enables the controller to handle transport of the messages over the external communication path in a manner conforming to the further communication protocol despite content of the messages passed over that protocol agnostic interface being formed using the second communication protocol.

10. An apparatus as claimed in claim 8, wherein:
    the messages transferred over the protocol agnostic interface form packets, where each packet comprises one or more messages, and in accordance with the messaging protocol a final message in each packet is accompanied by a last message flag;
    the lower selected layer circuitry within the controller is arranged to perform one or more functions that require, in presence of a trigger condition, generation of one or more additional packets to insert within a sequence of packets to be transmitted between the gateway component and the external communication path; and
    the presence of the last message flag enables the lower selected layer circuitry to determine boundaries between packets without knowledge of the content of each message, and hence determine when the one or more additional packets can be inserted.

11. An apparatus as claimed in claim 8, further comprising:
    at least one further protocol conversion circuitry, each further protocol conversion circuitry comprising a further gateway component but being arranged to share the controller with the protocol conversion circuitry;
    wherein:
    the controller is arranged to implement multiple protocol stacks, comprising a first protocol stack that incorporates the lower selected layer circuitry and is used to process messages passed between the controller and the gateway component of the protocol conversion circuitry, and an additional protocol stack provided for each further protocol conversion circuitry to process messages passed between the controller and the further gateway component of that further protocol conversion circuitry; and the protocol agnostic interface is used to communicate between the controller and each of the gateway component and the at least one further gateway component.

12. An apparatus as claimed in claim 11, wherein the messages transferred over the protocol agnostic interface have a type flag associated therewith that is used to determine which protocol stack those messages relate to.

13. An apparatus as claimed in claim 8, wherein the messaging protocol employed by the protocol agnostic interface is a point-to-point streaming protocol.

14. An apparatus as claimed in claim 1, wherein the external communication path operates in accordance with the second communication protocol.

15. An apparatus as claimed in claim 1, wherein:
the protocol conversion circuitry is arranged to support conversion of messages between the first communication protocol and a selected one of multiple second communication protocols;
the gateway component has protocol specific circuitry to process messages conforming to each of the multiple second communication protocols; and
the controller has generic circuitry that is agnostic to which of the multiple second communication protocols the messages processed by the controller conform to.

16. An apparatus as claimed in claim 1, further comprising:
further protocol conversion circuitry comprising a further gateway component, but being arranged to share the controller with the protocol conversion circuitry.

17. An apparatus as claimed in claim 1, wherein the first communication protocol is a proprietary on-chip bus protocol, and the second communication protocol is a standard off-chip bus protocol.

18. A gateway component for coupling between interconnect circuitry and a controller used to control connection with an external communication path, the gateway component for operating in combination with the controller to form protocol conversion circuitry used to convert messages that are routed though the protocol conversion circuitry between a first communication protocol and a second communication protocol, the second communication protocol having a layered architecture comprising multiple layers, the gateway component comprising:
upper selected layer circuitry to implement a first portion of functionality of a selected layer of the multiple layers, the first portion comprising at least protocol dependent functionality of the selected layer;
wherein the gateway component is arranged to communicate with the controller in a manner that enables the controller to implement a remaining portion of the functionality of the selected layer, the remaining portion comprising only protocol independent functionality of the selected layer.

19. A controller for coupling between an external communication path and a gateway component provided for interconnect circuitry, wherein the controller is used to control connection with the external communication path and is arranged to operate in combination with the gateway component to form protocol conversion circuitry used to convert messages that are routed though the protocol conversion circuitry between a first communication protocol and a second communication protocol, the second communication protocol having a layered architecture comprising multiple layers, the controller comprising:
message processing circuitry to process messages in a manner that takes into account that the gateway component is arranged to implement a first portion of functionality of a selected layer of the multiple layers, the first portion comprising at least protocol dependent functionality of the selected layer; and
the message processing circuitry comprises lower selected layer circuitry to implement a remaining portion of the functionality of the selected layer, the remaining portion comprising only protocol independent functionality of the selected layer.

20. A method of handling protocol conversion, comprising:
employing interconnect circuitry to route messages between components coupled to the interconnect circuitry, the messages routed over the interconnect circuitry conforming to a first communication protocol;
employing protocol conversion circuitry, coupled between the interconnect circuitry and an external communication path, to convert messages that are routed though the protocol conversion circuitry between the first communication protocol and a second communication protocol, the second communication protocol having a layered architecture comprising multiple layers;
implementing the protocol conversion circuitry using a gateway component forming one of the components coupled to the interconnect circuitry, and a controller coupled with the gateway component and used to control connection with the external communication path; and
for a selected layer of the multiple layers:
providing within the gateway component upper selected layer circuitry to implement a first portion of functionality of the selected layer, the first portion comprising at least protocol dependent functionality of the selected layer; and
providing within the controller lower selected layer circuitry to implement a remaining portion of the functionality of the selected layer, the remaining portion comprising only protocol independent functionality of the selected layer.

* * * * *